United States Patent Office 3,544,500
Patented Dec. 1, 1970

3,544,500
POLYMER COATED PARTICLES
Desmond Wilfrid John Osmond, Windsor, and Anthony Gifford Moody, Alvanley, England, assignors to Imperial Chemical Industries Limited, London, England, a corporation of Great Britain
No Drawing. Filed Nov. 10, 1966, Ser. No. 593,314
Claims priority, application Great Britain, Nov. 11, 1965, 47,901/65
Int. Cl. C08f 45/02, 47/18
U.S. Cl. 260—29.6
14 Claims

ABSTRACT OF THE DISCLOSURE

Encapsulation of solid particles is achieved by carrying out an aqueous emulsion polymerization process in the presence of the solid particles dispersed in the aqueous phase, the particles having adsorbed on their surface a water-insoluble polymer and being stabilized in the aqueous phase by a compound containing an anchor component which is associated with the adsorbed polymer and a pendent chain-like hydrophilic component which is solvated by the aqueous phase and so provides a stabilizing sheath around the particles. The preparatory treatment of the particles which results in adsorption of polymer on the surface of the particles and the association of the stabilizing component therewith prior to polymerization is achieved by modifying a dispersion of the particles in a solution of the polymer and stabilizing compound to cause the polymer to become insoluble therein.

This invention relates to processes of providing disperse solid particles, such as pigment particles, with an encapsulating layer of an addition polymer.

We have found that this encapsulation of solid particles can be achieved by carrying out an aqueous emulsion polymerization process in the presence of the solid particles dispersed in the aqueous phase, the particles having adsorbed on their surface a water-soluble polymer and being stabilized in the aqueous phase by a compound containing an anchor component which is associated with the adsorbed polymer and a pendent chain-like hydrophilic component which is solvated by the aqueous phase and so provides a stabilizing sheath around the particles.

The particles may be encapsulated in any of the wide variety of polymers which can be prepared by conventional aqueous emulsion polymerization, for example, polymers and copolymers of vinyl acetate, vinyl chloride, acrylic and methacrylic esters such as methyl methacrylate, styrene, vinyl toluene and butadiene.

The preparatory treatment of the particles which results in adsorption of polymer on the surface of the particles and the association of the stabilizing component therewith prior to polymerization may be achieved by modifying a dispersion of the particles in a solution of the polymer and stabilizing compound to cause the polymer to become insoluble therein. Since the modified dispersion is then to be embodied in the aqueous phase of an emulsion polymerization, an objective is so to modify the solution that it is essentially aqueous and of such a character, e.g., in respect of pH value and total ion concentration that it can provide, or can be incorporated in, such an aqueous phase. The modification of the solution may involve modification of the liquid so that it is no longer a solvent for the polymer or modification of the polymer so that it is n longer soluble in the liquid.

The solid particles may be dispersed in the solution of polymer by grinding, milling or other technique, and at this first stage they are stabilized in disperse form by polymer adsorbed from the solution, the polymer still being solvated by the liquid. The particles may be dispersed in a solution of the polymer and stabilizer in the liquid but preferably they are dispersed in a solution of the polymer in the liquid, the stabilizer being added after dispersion of the particles. In the second stage of the preparatory treatment the nature of the solution is modified so that the adsorbed polymer is no longer soluble in the liquid continuous phase but the chain-like hydrophilic component of the stabilizing compound remains solvated by it. As a result of the modification of the solution the anchor component of the stabilizer becomes associated with the now insoluble polymer adsorbed on the disperse particles whilst the other chain-like component remains solvated by the liquid forming the continuous phase and provides a stabilizing sheath around the particles. The stabilizer may be added before the modification of the solution or at the same time as the modification takes place.

In one form of the preparatory treatment a dispersion of the particles in a solution of the polymer and the stabilizing compound in a polar organic liquid which is miscible with water (or a mixture of such a liquid with water) is modified by addition of water so that the resulting mixture of water and organic liquid is a non-solvent for the polymer but continues to solvate the chain-like hydrophilic component of the stabilizer. Suitable polar organic liquids include water-miscible alcohols, ketones, and ethers containing up to five carbon atoms, e.g., ethanol, isopropanol, acetone, and β-ethoxy ethanol. If desired, at least part of the organic liquid can be removed from the resulting mixture, e.g., by distillation.

In another form of the preparatory treatment a dispersion of the particles in an aqueous solution of ionized polymer and stabilizing compound is modified by changing its pH value to a value at which non-solvated un-ionized polymer is formed. Soluble ionized polymer may be derived from a water-soluble salt of a polymer containing acidic groups such as carboxyl groups or phenolic hydroxyl groups. For example, the polymer may be derived in part from a carboxyl-containing monomer; suitable copolymers include addition copolymers derived from an ethylenically unsaturated monomer such as an acrylate or vinyl benzene and an ethylenically unsaturated acid such as methacrylic acid, fumaric acid or maleic anhydride. Other suitable polymers containing acidic groups are phenol formaldehyde resins. Suitable salts include those of sodium, potassium, ammonium and amines. Using solutions of such salts un-ionized polymer which is non-solvated by water can be formed by reducing the pH value of the solution. Alternatively, the water-soluble salt may be an acid salt of a polymer containing basic groups, for example, a copolymer derived in part from an amine-containing monomer such as a copolymer of an acrylate and say dimethyl amino-ethyl methacrylate or vinyl pyridine. Using solutions of such salts un-ionized polymer which is non-solvated by water can be formed by increasing the pH value of the solution.

In another form of the invention un-ionized polymer may be formed from solutions of ionized acidic polymers by adding a polyvalent metal ion, e.g., one of calcium, zinc, lead or aluminium, which will form an insoluble salt of the polymer.

The final product of these forms of preparatory treatment should be a dispersion of treated particles in an essentially aqueous liquid in which an emulsion polymerization can then be carried out or which may be incorporated in a subsequent emulsion polymerization without incurring any further substantial modification of the environment of the particles.

In the stabilizing compound, the pendent chain-like hydrophilic component contains highly polar groups so that the component is solvated by essentially aqueous liquids in the pH range involved in aqueous emulsion polymerizations and where necessary over the pH range involved in the modification of the solution or by polar organic liquid mixtures involved in the modification stage. It may range in size from a polymeric chain to a relatively short chain of as few as 12 or 15 co-valently linked atoms in length. Suitable components include poly(ethylene oxide) and copolymers with minor proportions of higher alkylene oxide, polyvinyl pyrrolidone, poly(meth)acrylic acid, polyvinyl alcohol and copolymers of vinyl acetate and itaconic or maleic acids.

The anchor component of the stabilizing compound is one which is relatively non-solvated by the continuous phase of the modified solution and is capable of becoming associated with the adsorbed polymer. Preferably it is polymeric and of a similar nature to the adsorbed polymer in which case it may be a graft copolymer comprising a hydrophilic polymeric segment as described above and a polymeric segment as later described with reference to the adsorbed polymer. Alternatively, the stabilizing compound may be a suitable conventional surface active agent of a type usable in emulsion polymerization processes and in these cases the anchor component is commonly derived from a higher alkyl phenol, poly(propylene oxide) or a fatty chain of more than 12 carbon atoms. Such stabilizers include, for example, higher alkyl phenyl ethers of poly(ethylene glycols) and block copolymers of poly(propylene oxide) and poly(ethylene oxide).

In general, because of the need to modify the solution containing the stabilizer, the stabilizer will be a non-ionic one providing a steric stabilizing sheath around the particles. Optionally such non-ionic stabilizers may be supplemented by ionic types which have their maximum effect in the conditions obtaining after modification of the solution in the preparatory stage and these ionic types are preferably added after that stage.

A simple test for suitable stabilizers is to modify a solution of polymer as in the preparatory stage in the presence of the potential stabilizer but in the absence of the disperse solid particles. If a dispersion of the initially-soluble polymer is formed, and not simply a coagulated mass of precipitated polymer, then the stabilizer is suitable for use in this invention.

In the process of this invention it is convenient and may be advantageous to select a stabilizer which can be used both in the preparatory treatment of the disperse particles and in the emulsion polymerization process. Further, in the emulsion polymerization process the stabilizer needed in that process is preferably added continuously or at intervals throughout the polymerization so as to avoid a high initial concentration which might result in the polymer produced in the polymerization forming new particles of polymer instead of encapsulating the existing disperse particles.

By aqueous emulsion polymerization we mean the conventional type of process in which a monomer is dispersed in an aqueous phase which contains initiator and surface active agent, monomer being provided at the site of polymerization in micelles or at polymer surfaces by diffusion through the aqueous phase from the relatively coarse disperse droplets of monomer.

The polymer adsorbed on the disperse particles in the preparatory treatment need not be identical with that in which the particles are to be encapsulated in the dispersion polymerization process. In fact, it is preferred that some or all of the polymer to be adsorbed on the particles in the preparatory coating should contain polar groups which will promote adsorption of the polymer on the surface of the solid. Such polar groups include —COOH, —SO$_3$H, —SO$_4$H, —PO$_4$H$_2$, —PO$_3$H$_2$, and —NR$_1$R$_2$ where R$_1$ and R$_2$ may be aryl, aralkyl, alkyl, cycloalkyl or hydrogen or, together, may form a ring structure which optionally may contain a hetero-atom and optionally may be saturated or unsaturated. The type of polar group will be selected in accordance with the solid particles to be treated; for example, acid groups for particles having basic groups on the surface and vice versa. These polar groups may be incorporated in the polymer, for example, by copolymerization of a minor proportion of a monomer containing such a group either with a main monomer to form a random copolymer or with chains of the polymer containing a copolymerizable group to form a polymeric chain to which the chains of polymer to be adsorbed are attached, i.e., a segmented copolymer.

A general requirement for encapsulation of the pretreated particles is that the adsorbed polymer should be one for which the monomer to be polymerized is a swellant or solvent. A simple test for suitability of the polymer to be adsorbed is, therefore, to immerse a piece of the solid polymer in the monomer or mixture of monomers to be polymerized and determine whether or not it is swollen, or even dissolved, by the monomer or monomers. If it is at least swollen to the extent of 1% by weight and preferably to at least 5% by weight then it can be used in the pretreatment of the particles. Subject to this limitation a wide range of polymers can be used, including condensation polymers such as polyesters and phenol formaldehyde resins and addition polymers such as those of acrylates, vinyl benzenes, esters and ethers of vinyl alcohol, vinylidene chloride, butadiene and isoprene. Where necessary, adsorption of such polymers can be promoted by incorporation of polar groups as described above. Clearly, any polymer used in the pretreatment of the particles should not be one which will inhibit the subsequent polymerization of monomer.

Any excess free polymer in the preparatory treatment of the solid particles, i.e., polymer which was not associated with a solid particle but, now being insoluble in the continuous phase, is in the form of a stably-dispersed polymer particle, will also grow by acretion of polymer in the dispersion polymerization and so, in order to obtain the maximum degree of particle encapsulation, it is important to keep the number of such "pure" polymer particles to a minimum. This can readily be achieved by having present in the preparatory treatment no more than that amount of polymer required to treat the particles. This will vary with the particle size or surface area of the dispersed particles to be treated, but in any particular case the optimum proportion of polymer to particles can be determined by simple trial. In cases where the particles to be encapsulated are more dense than the polymer, any excess unadsorbed polymer existing in the modified continuous phase may be detected by centrifugation whereby the relatively dense treated particles can be separated out leaving the less dense polymer particles still in suspension where they are easily detectable and their proportion determinable on separation by further centrifugation. This test is particularly useful when the particles are pigment particles. If excess polymer is found in the form of "pure" polymer particles the proportion used in the preparatory treatment should be correspondingly reduced.

As a general rule, suitable proportions of polymer for adsorption will be in the range 0.001–0.05 gm./m.$^2$ of particle surface, preferably in the range of 0.003–0.01 gm./m.$^2$, but as a final check on the suitability of the proportion in any particular case the above-mentioned simple test can be applied. Further, in order to ensure adequate stabilization after the modification step the stabilizer present should provide the constituent still solvated by the modified continuous phase in a proportion in the range 5% to 100% by weight of the polymer, preferably 15% to 45%. The most suitable proportion to use in any particular case will depend, for example, on the length of the stabilizing solvated chain; in general, the longer this is, the more stabilizer will be required.

The size of the disperse solid particles present in the dispersion polymerization is not critical; it may range, for example, from a few hundred A. to 10$\mu$, and the growth in size of the particles on encapsulation will depend on the amount of polymer required to be coated onto the initially-dispersed particles to achieve any desired solid/polymer ratio. For example, where the solid is a pigment and the encapsulated pigment particles are to be used in paint compositions, the proportion of pigment to polymer may range from 2.5% to 45% by volume depending on the nature of the pigment and of the final paint composition. Once dispersion polymerization and coating of the dispersed particles have commenced, the particles will thereafter behave as would 100% polymer particles in the aqueous emulsion polymerization and polymerization may be continued as long as the particles remain stably-dispersed up to a disperse phase volume of 50% or higher.

We have found that the resulting dispersions of encapsulated particles are of particular value in the preparation of pigmented coating compositions. Coating compositions made by dispersing pigment in stable polymer dispersions made by aqueous emulsion polymerization are known. These conventional dispersion-type coating compositions are pigmented by addition of dispersed pigment to the polymer dispersion and so, when mixtures of pigments were used, the possibility of pigment separation or migration on application of the composition, giving rise to the defects of flooding or floating, can and does arise. In the application of the present invention to the encapsulation of mixtures of pigments we have found that during the modification step in the preparation treatment some aggregation of different pigment particles may take place; when these mixed aggregates are encapsulated the pigment particles are then, so to speak, locked together in the capsule of film-forming polymer which, even during integration of the polymer particles into a film, does not normally become sufficiently fluid for the different pigment particles to separate or migrate.

Further, it was found in dispersion coating compositions of the old conventional type that the most suitable polymer dispersions to use, from the point of view of obtaining well-integrated films, were those having a polymer particle size of about $0.1\mu$ to $0.5\mu$. However, one minor disadvantage of such coating compositions was that evaporation of the liquid continuous phase at temperatures below that at which integration of the polymer particles takes place could result in "mud-cracking" which showed up as a defect in the finally integrated paint film.

We have now found that if dispersion coating compositions are based on encapsulated pigment of overall particle size not less than $0.75\mu$ the tendency to "mud-crack" is markedly reduced, and at particle sizes of above $1.0\mu$ is substantially eliminated, whilst a high standard of film integration and uniform pigment distribution can be maintained.

A wide variety of particulate solids may be encapsulated in polymer by the process of this invention, pigments being specially suitable for treatment in this way. Typical pigments which may be encapsulated for use, for example, in coating compositions or in moulding powders include inorganic types such as titanium dioxide, zinc oxide, antimony oxide, red oxide, yellow oxide, lemon chrome, Prussian blue and cobalt blue, organic types such as azo pigments, quinacridone pigments, indigoid and thio-indigoid pigments and phthaloxyanine blues and greens, metal-containing organic pigments, lakes and carbon blacks such as vegetable black. Other particulate solids which may be encapsulated in polymer by the process of this invention include polymers other than the encapsulating polymer, blowing agents, insecticides, pharmaceuticals, cross-linking agents, metal flakes and powders.

The invention is illustrated by the following examples in which all parts are by weight.

EXAMPLE 1

100 parts of rutile titanium dioxide having a surface area of about 12 m.²/gm. were slurried in 60 parts of water and to the slurry were added 40 parts of a solution containing 6 parts of a poly(vinyl pyrrolidone)/poly(methyl methacrylate) graft copolymer and 4 parts of poly(methyl methacrylate) dissolved in $\beta$-ethoxy ethanol. The poly(methyl methacrylate) chains in the homo-polymer and in the graft copolymer had a molecular weight of 3,000–5,000 and the poly(vinyl pyrrolidone) chains in the graft copolymer had a molecular weight of about 15,000–20,000. The mixture was ground by stirring with glass-beads for 15 minutes and, with continued stirring, was diluted with 200 parts of water. Although the polymethyl methacrylate chains were solvated by the solvent mixture of solution and slurry this further addition of water resulted in an aqueous phase which did not solvate them, with the results that the chains collapsed on the surface of the pigment particles on which they had been adsorbed. The poly(methyl methacrylate) chains similarly became non-solvated and associated themselves with the adsorbed polymer. On the other hand, the poly(vinyl pyrrolidone) chains remained solvated by the dilute mixture and provided a stabilizing solvated barrier around the particles.

300 parts of the diluted dispersion were placed in a reaction vessel together with a solution of 0.4 part of a di-sodium salt of ethylene diamine tetra-acetic acid and 0.2 part of ferrous ammonium sulphate in 14.4 parts of water. The charge was heated to 80° C. and after the addition of a mixture of 0.75 part hydrogen peroxide (100 vol.) and 3 parts water a mixture of 147 parts methyl methacrylate and 3 parts metharcylic acid was fed in over 2 hours. During this feed three further additions of hydrogen peroxide and water were made at half-hour intervals. After completion of the addition of monomers heating was continued for a further half hour.

The product was a stable dispersion in which all the pigment particles were encapsulated in polymer, the average particle size being less than $1.0\mu$.

EXAMPLE 2

Example 1 was repeated using a 98/2 methyl methacrylate/methacrylic acid copolymer as the polymer to be adsorbed and adding the graft copolymer after the grinding of the pigment but before the dilution stage.

A similar dispersion of encapsulated pigment was obtained.

EXAMPLE 3

10 parts of a 0.880 ammonia solution were stirred with a solution of 10 parts of 1/1 methy methacrylate/methacrylic acid copolymer dissolved in 30 parts of a 95/5 mixture of $\beta$-ethoxy ethanol and water. 60 parts of distilled water were then added and 200 parts of rutile titanium dioxide as used in Example 1 were slurried in the aqueous mixture, the slurry then being ground by stirring with beads for 10 minutes. To the resulting dispersion was then added, with high-speed stirring, a solution in 20 parts distilled water of 6 parts of a nonyl phenyl ether of polyethylene glycol (phenol:glycol ratio 1:20). This was followed by addition of a solution of 3 parts concentrated hydrochloric acid in 250 distilled water. The addition of hydrochloric acid converted the solvated ionized copolymer to non-ionized non-solvated copolymer, the chains of which consequently collapsed on the surface of the pigment particles on which they had been adsorbed.

540 parts of the pigment dispersion were poured into a reaction vessel together with a solution of 0.8 part potassium persulphate in 10 parts distilled water. The charge was heated to 85° C. and the following two mixtures were added simultaneously over a period of 1½ hours.

(1)

| | Parts |
|---|---|
| Distilled water | 100 |
| Potassium persulphate | 1.6 |
| Phenyl ether (as above) | 5 |

(2)

Methyl methacrylate _____ 156
Methacrylic acid _____ 4

After the addition was completed, heating was continued for a further half an hour to ensure complete polymerization of the monomers. The final product was a free-flowing dispersion containing pigment particles encapsulated in polymer, the average particle size being about $1.0\mu$.

EXAMPLE 4

Example 3 was repeated but the pH change was brought about using, instead of the hydrochloric acid solution, 36 parts of a 35% by weight solution of formaldehyde in water. An excess of formaldehyde was used because the reaction with ammonia does not go to completion. Also the modification of the pH value was carried out at 60° C. The resulting encapsulated pigment dispersion was more coarse and also contained encapsulated particles of hexamine formed by reaction between the formaldehyde and ammonia.

EXAMPLE 5

200 parts of rutile titanium dioxide were dispersed in 75 parts of water containing 0.5 part of sodium hexameta phosphate by stirring the mixture in the presence of glass beads. A solution of a salt of a carboxylic acrylic polymer was made by mixing 30 parts of a 30% by weight solution of a methyl methacrylate/methacrylic acid copolymer (3:7) in $\beta$-ethoxy ethanol with a solution of 4 parts of 1 N NaOH soln. in 60 parts water. The polymer salt solution was added to the stirred pigment dispersion.

Stirring was continued whilst adding:

(i) a solution of 0.111 part zinc acetate dihydrate in 125 gms. water, followed by
(ii) a solution of 0.333 part zinc acetate dihydrate and 4 parts of a block copolymer of ethylene oxide and propylene oxide in 370 parts water.

The resulting mixture was filtered through lambswool to remove the glass beads.

864 parts of the pigment dispersion were placed in a reaction vessel and heated to 55° C. Two feeds were then added simultaneously to the stirred charge, over a period of three hours.

Feed one consisted of 200 parts vinyl acetate and 2 parts of tertiary butyl hydroperoxide emulsified in a solution of 6 parts of block copolymer of ethylene oxide and propylene oxide dissolved in 100 parts of water.

Feed two consisted of a solution of two parts of sodium metabisulphite in 20 parts water.

After the addition was completed, heating was continued for a further half hour to ensure complete polymerization of the monomer. The final product was a free flowing dispersion containing pigment particles encapsulated in polymer. The average particle size was about $0.6\mu$.

EXAMPLE 6

250 parts of Turkey Red Oxide having a surface area of about 5 m.$^2$/gm. were dispersed in 120 parts of water containing 0.4 part of sodium hexameta phosphate by stirring the mixture in the presence of glass beads. A solution of a salt of a carboxylic acrylic polymer was made by mixing 30 parts of a 30% by weight solution of a (3:7) methyl methacrylate/methacrylic acid copolymer in $\beta$-ethoxy ethanol with a solution of 6 parts of 1 N NaOH solution in 60 parts of water. The polymer salt solution was added to the stirred pigment dispersion. Stirring was continued whilst adding:

(i) a solution of 0.2 part zinc acetate dihydrate in 120 parts of water, followed by
(ii) a solution of 0.8 part zinc acetate dihydrate and 1.55 parts of a block copolymer of ethylene oxide and propylene oxide in 380 parts of water.

The resulting dispersion was filtered through lambswool to remove the glass beads.

966 parts of the above dispersion were placed in a reaction vessel and heated to 55° C. Two feeds were then added to the stirred charge simultaneously over a period of three hours.

Feed one consisted of an emulsion of 250 parts of vinyl acetate and 2.5 parts of tertiary butyl hydroperoxide, in 100 parts of water containing 4.65 parts of block copolymer of ethylene oxide and propylene oxide.

Feed two consisted of a solution of 2.5 parts of sodium metabisulphite in 25 parts of water.

After addition of the feeds, heating was continued for a further half hour to ensure complete polymerization of the monomer. The final product was a free flowing dispersion containing pigment particles encapsulated in polymer. The average particle size was about $1.0\mu$.

EXAMPLE 7

125 parts of phthalocyanine blue having a surface area of about 55 m.$^2$/gm. were dispersed in 100 parts of water containing 16 parts of block copolymer of ethylene oxide and propylene oxide by stirring the mixture in the presence of glass beads.

To the pigment dispersion were added the three solutions the mixture in the presence of glass beads.

To the pigment dispersion were added the three solutions as described in Example 6: the only difference being that the third solution contained 16 parts of block copolymer of ethylene oxide and propylene oxide, instead of the 1.55 parts used in Example 6.

The resulting dispersion was filtered through lambswool to remove the glass beads.

847 parts of the above dispersion were placed in a reaction vessel and heated to 55° C. Two feeds were then added to the stirred charge simultaneously over a period of three hours.

Feed one consisted of an emulsion of 125 parts vinyl acetate and 1.25 parts tertiary butyl hydroperoxide in 100 parts of water containing 22 parts of block copolymer of ethylene oxide and propylene oxide.

Feed two consisted of a solution of 1.25 parts sodium metabisulphite in 20 parts water.

The final dispersion was again heated for a further half hour to ensure complete polymerization of the monomer. The final product was a free flowing dispersion containing pigment particles encapsulated in polymer.

EXAMPLE 8

125 parts of rutile titanium dioxide and 62.5 parts of phthalocyamine blue pigment were dispersed in 100 parts of water containing 10 parts of block copolymer of ethylene oxide and propylene oxide by stirring the mixture in the presence of glass beads.

To the pigment dispersion were added the same three solutions used in Example 6: the only difference being that the third solution contained 10 parts instead of 1.55 parts of block copolymer of ethylene oxide and propylene oxide.

The resulting dispersion was filtered through lambswool to remove the glass beads.

905 parts of the above dispersion were placed in a reaction vessel and heated to 55° C. Two feeds were added to the stirred charge simultaneously over a period of three hours.

Feed one consisted of an emulsion of 187.5 parts of vinyl acetate and 1.9 parts of tertiary butyl hydroperoxide in 100 parts of water containing 14 parts block copolymer of ethylene oxide and propylene oxide.

Feed two consisted of a solution of 1.9 parts sodium metabisulphite and 20 parts of water.

The final dispersion was heated for a further half hour to ensure complete polymerization of the monomer. The product was a free flowing dispersion containing pigment particles encapsulated in polymer.

EXAMPLE 9

Example 3 was repeated using 6.9 parts of cobaltic chloride instead of 3 parts concentrated hydrochloric acid as the precipiting agent.

A similar dispersion of encapsulated pigment was obtained: the only difference being that this dispersion was tinted pink.

EXAMPLE 10

250 parts of rutile titanium dioxide having a surface area of about 12 m.$^2$/gm. were dispersed in 250 parts of water containing 12.5 parts of 1:1 styrene/maleic anhydride copolymer which had been partially neutralised by 5 parts of 0.88 ammonia, by stirring in the presence of beads. To the pigment dispersion was added a solution of 400 parts of water containing 8 parts of concentrated hydrochloric acid and 3.6 parts of the sodium salt of dioctyl sulphosuccinate.

The final dispersion was filtered through lambswool to remove the beads.

900 parts of the above dispersion were placed in a reaction vessel and heated to 75° C. on a water bath. Two feeds were added to the reaction vessel simultaneously over a period of 3 hours. Feed one, consisted of 250 parts of vinyl toluene and 9.2 parts of the sodium salt of dioctyl sulphosuccinate.

Feed two consisted of 1.25 parts of potassium persulphate dissolved in 50 parts of water. The final dispersion was heated for a further half an hour to ensure complete polymerization of the monomer. The product was a free-flowing dispersion containing pigment particles encapsulated in polymer.

EXAMPLE 11

Example 10 was repeated using lauryl methacrylate as the monomer in the feed.

A similar dispersion of encapsulated pigment was obtained.

We claim:

1. A process of encapsulating pigment particles with an addition polymer by carrying out an aqueous emulsion polymerization process in the presence of the pigment particles dispersed in the aqueous phase, the pigment particles having adsorbed on their surface a water-insoluble polymer and being stabilized in the aqueous phase by a stabilizer compound containing (a) an anchor component, said anchor component being relatively non-solvated in the aqueous phase and associated with the adsorbed polymer and (b) a pendent hydrophilic polymer chain component which is solvated by the aqueous phase and so provides a stabilizing sheath around the pigment particles, the adsorbed water-insoluble polymer being one which is at least swollen by the monomer being polymerized to the extent of 1% by weight, the dispersion of pigment particles dispersed in aqueous phase being obtained by forming a dispersion of the pigment particles in a solution of the polymer and stabilizing compound and then modifying the solution to cause the polymer to become insoluble therein, a solution of said polymer and stabilizer compound not containing said dispersed pigment particles, when modified to cause the polymer to become insoluble therein, producing a dispersion of polymer and not a coagulated mass of precipitated polymer.

2. A process as claimed in claim 1 in which the adsorbed polymer is one which is at least swollen by the monomer being polymerized to the extent of 5% by weight.

3. A process as claimed in claim 1 in which the proportion of adsorbed polymer is from 0.001 to 0.05 gm./m.$^2$ of particle surface.

4. A process as claimed in claim 3 in which the proportion of adsorbed polymer is from 0.003 to 0.01 gm./m.$^2$ of particle surface.

5. A process as claimed in claim 1 in which the adsorbed polymer contains polar groups to promote adsorption on the particles.

6. A process as claimed in claim 1 in which, in adsorbing the said water-insoluble polymer on the particles, the solution of the polymer has been modified by addition of a non-solvent for the polymer or by removal of solvent for the polymer.

7. A process as claimed in claim 1 in which, in adsorbing said water-insoluble polymer on the particles, the solution of the polymer has been modified by converting the soluble polymer to an insoluble form.

8. A process as claimed in claim 7 in which the insoluble form of the said water-insoluble polymer is an unionized form produced by changing the pH value of the solution.

9. A process as claimed in claim 7 in which the insoluble form is a salt of the polymer produced by adding a polyvalent metal ion to the solution.

10. A process as claimed in claim 1 in which the stabilizer was added at the same time as the solution was modified in the adsorption of the said water-insoluble polymer on the particles.

11. A process as claimed in claim 1 in which the stabilizer is non-ionic.

12. A process as claimed in claim 1 in which the stabilizer present during the modification of the solution in the adsorption of the said water-insoluble polymer on the pigment particles was non-ionic, an ionic stabilizer for the aqueous emulsion polymerization process being added after said modification.

13. Encapsulated particles prepared by a process as claimed in claim 1.

14. Encapsulated particles as claimed in claim 13 in which the encapsulating polymer is a film-forming polymer.

References Cited

UNITED STATES PATENTS

| | | | |
|---|---|---|---|
| 3,291,768 | 12/1966 | Pfluger et al. | 117—100(R) |
| 3,330,693 | 7/1967 | Rumberger | 117—100(I) |
| 3,359,130 | 12/1967 | Goldman | 117—72 |

MURRAY TILLMAN, Primary Examiner

W. J. BRIGGS, Sr., Assistant Examiner

U.S. Cl. X.R.

117—47, 72, 100; 252—316; 260—29.3, 41, 874, 876, 901